Figure 1:
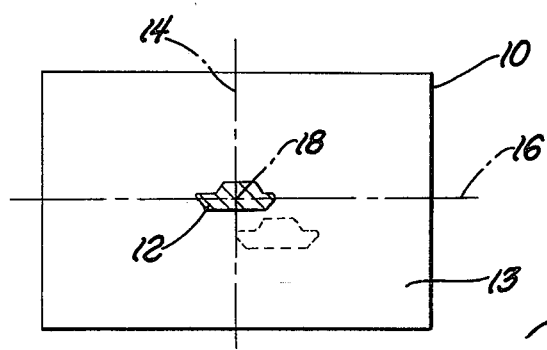

United States Patent [19]

Gay

[11] 4,316,218
[45] Feb. 16, 1982

[54] VIDEO TRACKER

[75] Inventor: Donald L. Gay, Daytona Beach, Fla.

[73] Assignee: The United States of America Government as represented by the Secretary of the Army, Washington, D.C.

[21] Appl. No.: 134,858

[22] Filed: Mar. 28, 1980

[51] Int. Cl.³ .............................................. H04N 7/18
[52] U.S. Cl. .............................. 358/125; 250/203 CT
[58] Field of Search .............................. 358/125, 126; 250/203 CT

[56] References Cited

U.S. PATENT DOCUMENTS

| | | | |
|---|---|---|---|
| 3,903,361 | 9/1975 | Alpers | 358/125 |
| 3,953,670 | 4/1976 | Prince | 358/125 |
| 3,988,534 | 10/1976 | Sacks | 358/126 |
| 4,053,929 | 10/1977 | Collins et al. | 358/126 |
| 4,060,830 | 11/1977 | Woolfson | 358/126 |
| 4,123,017 | 10/1978 | Lewis et al. | 358/126 |
| 4,189,747 | 12/1980 | Fumari | 358/125 |

Primary Examiner—Robert L. Richardson
Assistant Examiner—Edward L. Coles
Attorney, Agent, or Firm—Peter A. Taucher; John E. McRae; Nathan Edelberg

[57] ABSTRACT

Electrical control system for a video tracker, including circuitry for maintaining the size of the target substantially constant relative to the tracking window, thereby improving the accuracy of the target shift detection circuit. Additional circuitry is provided for enhancing contrast between the target and the background scene, thus preventing loss of the target due to inadvertant sensing of grey clutter instead of the true target.

5 Claims, 8 Drawing Figures

VIDEO TRACKER

BACKGROUND AND SUMMARY OF THE INVENTION

This invention relates to a video tracker usable by the military to obtain visual location of a moving target, either friendly or enemy; the target can be any bounded object of sufficient size and contrast, such as an aircraft, a ground vehicle, a missile, or ballistic projectile. When used to track an enemy missile or projectile the video tracker functions as a defensive mechanism for enabling the military commander to fire a projectile at the target, to throw up a protective mechanism (e.g. smoke), or to change the speed or direction of his vehicle. When used to track a friendly target (projectile or missile) the video tracker functions to control the commander's missile or gun, or to inform the commander of the hit/miss distance from the enemy objective.

An aim of the video tracker is to quantitatively detect target lock-on point changes occurring from one video frame to the next. The tracker is designed to separately detect changes on the X—X (azimuth) and Y—Y (elevation) axes, to thereby provide separate readouts for controlling the turret and gun on a military vehicle (the camera platform).

Another aim of the video tracker camera optical system is to maintain the target image as a fixed percentage of the video field of view over a substantial variation in target range, e.g. from 200 meters to 2500 meters. The target image is kept sufficiently large in the tracking window (field of view) that changes in the target lock-on point are properly detectable by the camera scanning system. At the same time the target image is not so large as to overfill the tracking window, with consequent loss of target outline necessary for lock-on point detection.

Another aim of the invention is to provide circuitry for adaptively thresholding the contrast between the target image and its background, thus providing increased assurance that the camera will follow a precise target lock-on point in spite of light level changes and background scene changes occurring in the course of the tracking operation.

THE DRAWINGS

FIGS. 1 through 4 show different conditions of a target within a video tracking window.

Figure 5:
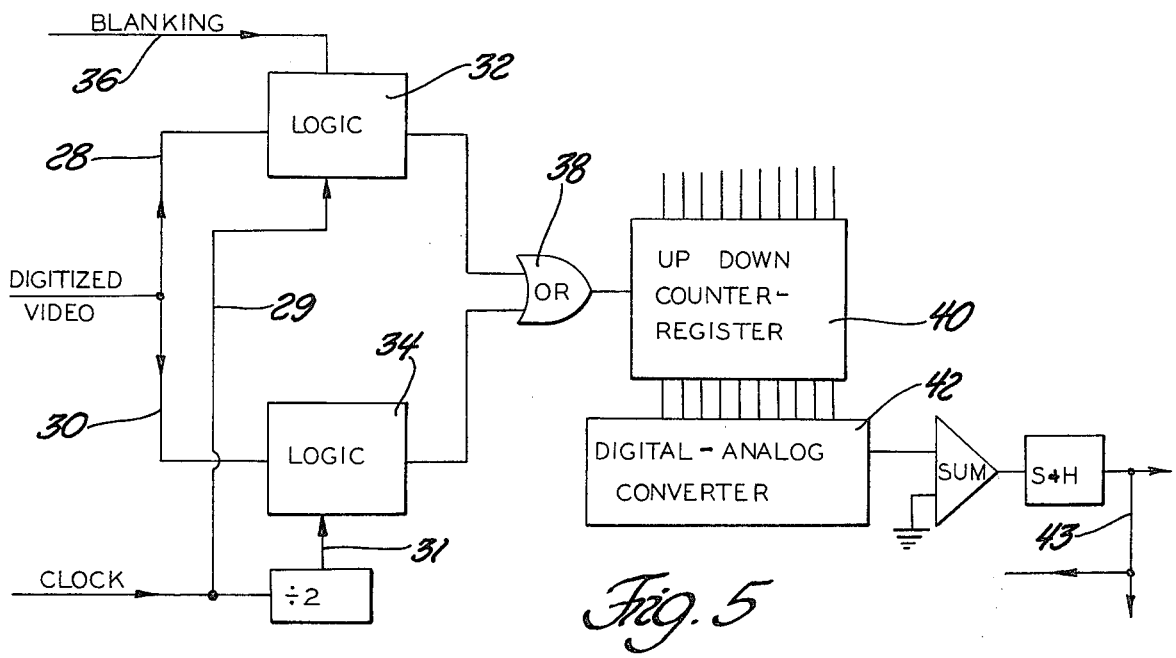
Figure 6:
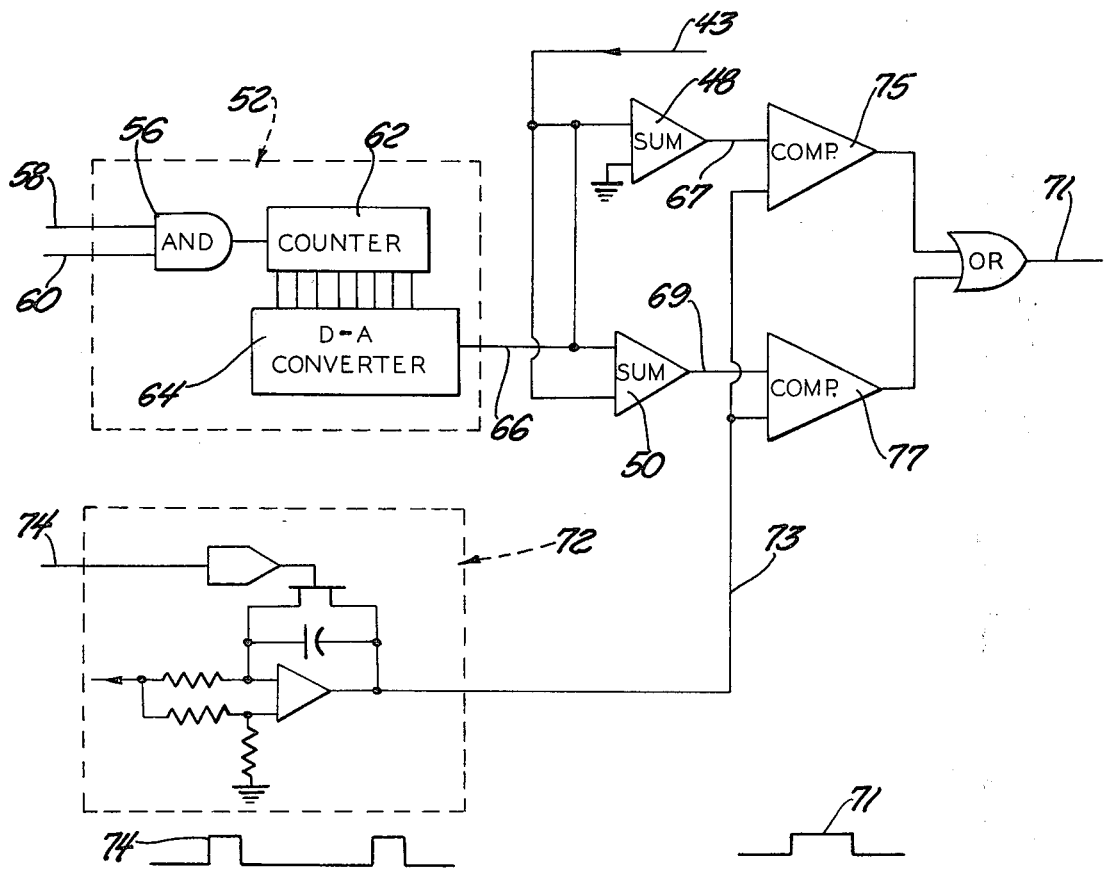
Figure 7:
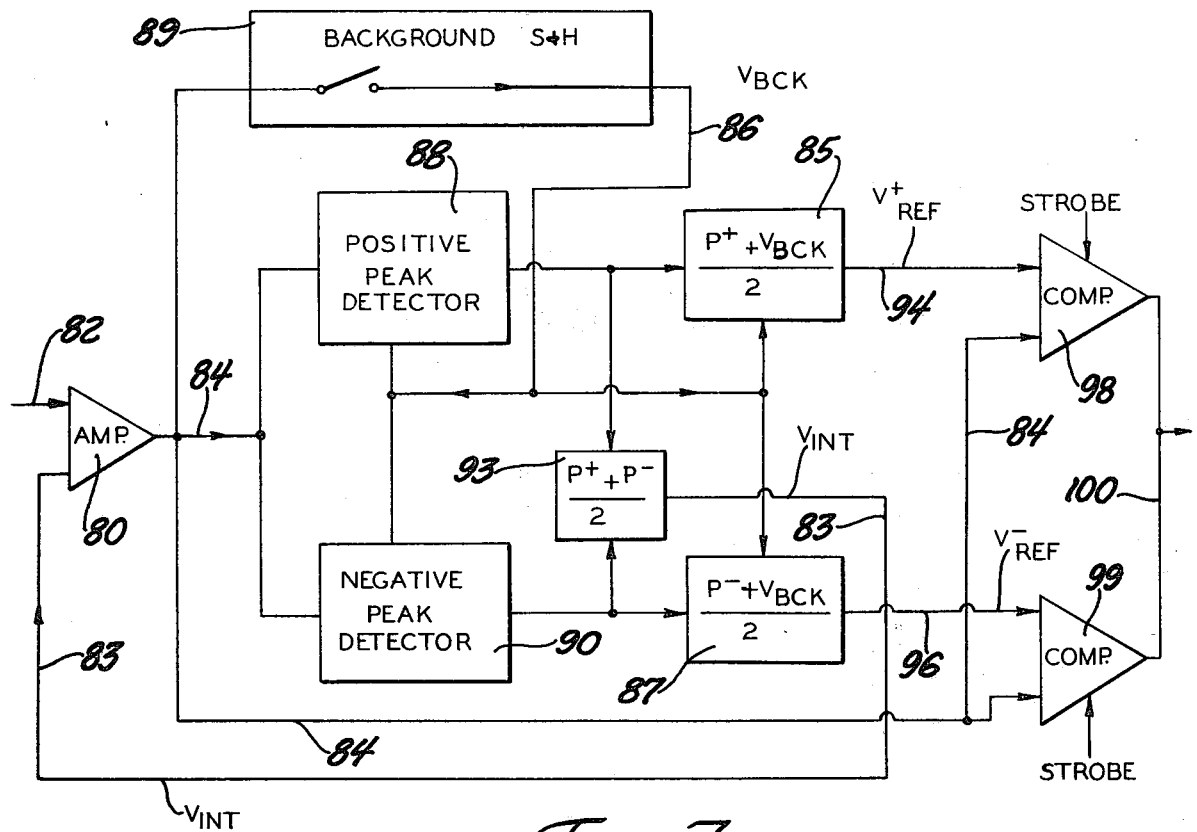

FIGS. 5 through 7 diagrammatically illustrate electric circuits usable in my invention to achieve a satisfactory targetwindow relationship.

Figure 8:
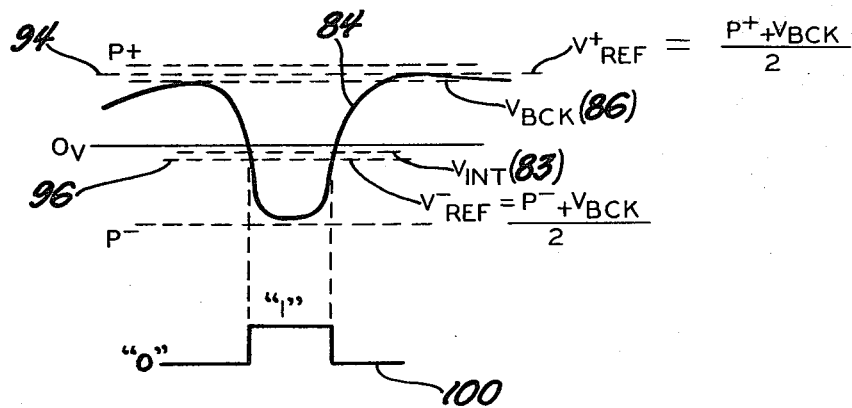

FIG. 8 illustrates voltage levels that can exist at selected locations in the FIG. 7 circuit.

Referring more particularly to FIG. 1, there is shown a video tracking window or field of view 10 that includes a target 12 and background scene 13. Imaginary horizontal and vertical center lines 14 and 16 provide a center reference point 18 that may be initially locked on to target 1 by manual control of the television camera sighting system. In this case the target happens to be an enemy tank. FIG. 1 also illustrates in dotted lines a dislocated position of the field of view from the target at the next video frame, e.g. 1/30 second later. This dislocation can occur for a combination of reasons, such as lateral movements of the enemy tank or pitching motion of the friendly vehicle (camera platform). To relock center point 18 onto target 12 it is necessary to reorient the optical system in a downward and rightward direction. This may be accomplished by applying signal voltages to torque motors connected to a sighting mirror optically located between the television camera and target 12.

SIZING THE TARGET

Figure 2:
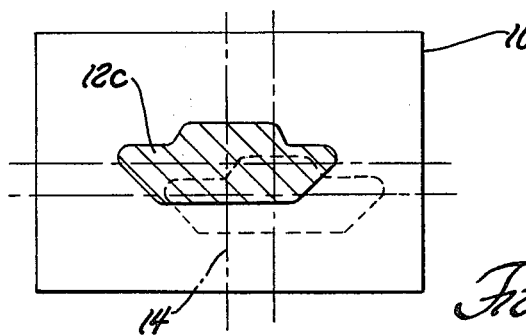

In FIG. 1 the size of target 12 (in relation to the field of view 10) is sufficient for acquiring the target but unduly small for accurate lock-on and tracking. For example, if target 12 has a real length of 20 feet then the dislocation depicted in FIG. 1 represents about 10 real feet in the azimuth direction and 8 real feet in the elevation direction. The magnitude of this dislocation may be difficult to instantaneously and completely counteract. FIG. 2 illustrates a field of view 10 wherein the target 12c occupies a larger percentage of the field of view. With the enlarged target 12c image the same milliradian dislocation (of FIG. 1) represents a real distance of about five feet in the azimuth direction and four feet in the elevation direction. Therefore unit corrective signals are effective to more quickly and more completely restore the field of view to a target-centered condition (compared to FIG. 1). The present invention is concerned with means for maintaining a relatively large target size compared to field of view while the azimuth-elevation correction signals are being applied to the sight system torque motors.

Figure 4:
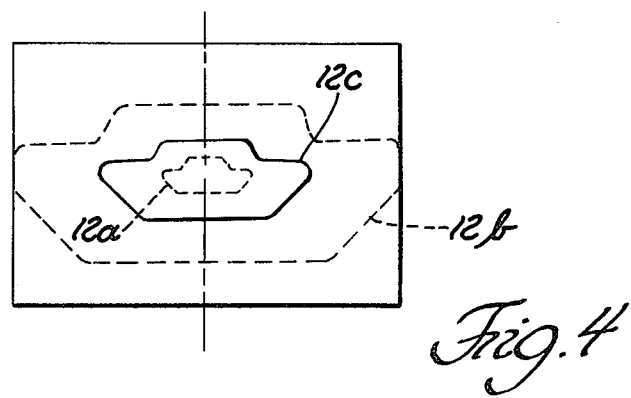

Preferably a relatively large size target image 12c is maintained while the real target is moving rapidly toward or away from the television camera within the range of the system, e.g. a near-in range distance of 200 meters and a maximum range distance of 2500 meters. FIG. 4 illustrates some of the possible target sizes that can occur at or near the minimum-maximum range limits unless corrections are made in the zoom-in camera optical magnification system. Target outline 12a represents insufficient target magnification, and target outline 12b represents excessive target magnification. Target outline 12c illustrates a satisfactory magnification, sufficient for enabling the camera optical system to maintain a target locked-on condition in spite of target image shifts in the azimuth or elevation directions. In reference to target outline 12b, it is noted that part of the outline overlaps or lies outside the tracking window (field of view); this is unsatisfactory for television video tracking because some of the horizontal scan lines do not count all of the picture elements that would make a true video picture. Under certain circumstances the target can shift relative to the field of view without producing a corresponding change in the video digitized output.

The video tracker of this invention detects target location shift (FIG. 1 or FIG. 2) by counting digitized video in horizontal scan lines passing across the background and target image. Changes in target size and aspect (relative to the field of view) change the relative number of target video spots (picture elements) and background spots. Preferably digitized video signal changes due to variation in size of the target are minimized as much as possible. Therefore, during the tracking process the size of the target image is maintained at a relatively fixed value, e.g. size 12c in FIG. 4. The present invention is directed in part to circuitry for developing an error signal representing change in the size of the target due to range change. The error signal can be applied to torque motor means which drives the camera zoom-in lens system toward greater or lesser magnification, as needed to maintain a given size target image.

TARGET SHIFT DETECTION

Figure 3:
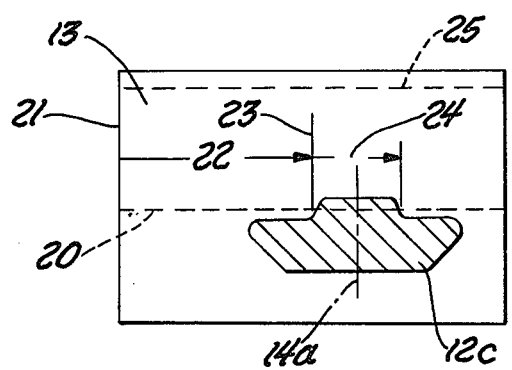

FIG. 3 pictorially illustrates certain features of the invention, including a method for repetitively determining target centerline along the X—X azimuth axis. The method uses digitized video outputs signals, e.g. a "0" logic signal for each picture element in background scene 13, and a "1" logic signal for each picture element in the target image 12c. The logic signals are counted for each TV scan line and then converted to an analog signal representing the target location in the field of view. In FIG. 3 the digitized video background signals in a representative scan line 20 are counted and clocked from the frame leading edge 21 to target leading edge 23, as denoted by line segment 22. The digitized video target image signals in segment 24 of scan line 20 are counted and halved, using a clock/2 counting system; the count therefore represents only one half the length of line segment 24, which effectively ends at the target centerline 14a. The total count for the two line segments 22 and 24 represents the target centerline (azimuth direction) for scan line 20. A similar counting process is used for all of the horizontal TV scan lines making up the frame. The analog output representing target azimuth provides an error signal usable to relock the camera optical line-of-sight onto the target in the azimuth plane. A similar counting-clocking system is used to maintain an optical track in the elevational plane.

The size of image 12 may be maintained at or near value 12c by a process that involves selectively counting the number of horizontal TV scan lines that pass through the target image (such as line 20 in FIG. 3) and the number of scan lines that pass only through the background scene (such as scan line 25 in FIG. 3). Change in the ratio of "target" scan lines to "background-only" scan lines is a measure of change in the target size. Scan line ratio change can be used to develop an error signal for correcting the camera magnification to bring the window image back to its desired size.

FIG. 5—TARGET SHIFT DETECTION CIRCUIT

FIG. 5 schematically illustrates a circuit for developing an analog signal representing horizontal shift of target centerline 14, 14a, etc. in FIGS. 2 and 3. Digitized video signals from the TV camera are applied through lines 28 and 30 to logic devices 32 and 34. Logic device 32 is activated by a signal received through line 36 coincident with frame leading edge 21 (FIG. 3). Clock pulses are delivered to logic device 32 through line 29; clock/2 pulses (one half clock frequency) are delivered to logic device 34 through line 31. Device 32 responds to digitized video signals at the "0" level associated with background scene 13; device 34 responds to digitized video signals at the "1" level associated with the target 12 scene. The logic outputs are sequentially applied through OR gate 38 to a counter-register 40 which has been preprogrammed with a known digital count; the programming operation is performed in the previous "blanking" interval between the trailing edge of the precedent video frame and the leading edge 21 of the instant frame.

During the tracking mode (e.g. scan line 20 in FIG. 3) the register 40 counts down for the duration of the line segments 22 and 24 (FIG. 3). The trailing edge 24 of the video image stops the clock; digital count remaining in the register represents the position of the image vertical centerline. Device 42 converts the count into an analog signal that is sampled and held for use during the next frame. Centerline values are computed for each scan line over the target 12 height. FIG. 5 illustrates circuitry for detecting frame-to-frame image centerline changes in the azimuth direction; similar circuitry can be used for detecting changes in the elevational direction.

FIG. 6—TARGET SIZING CIRCUIT

FIG. 6 schematically illustrates circuitry for resizing the tracking window to maintain a substantially constant size relation between target 12 and the window (field of view). Target height electronics 52 includes an AND gate 56 receiving an input signal 58 derived from each TV scan line that includes level "1" pulses associated with the target scene. A second input 60 is received coincident with each TV scan line passing only through the background scene (only level "0" pulses). The output of AND gate 56 represents the difference between total window height and target height. Counter 62 counts and delivers the digital output to a converter 64 that provides an analog voltage signal 66 related to the "window-target 12" height differential.

The width of the window bears a fixed ratio to the window height. Therefore analog signal 66 can be used as the starting basis for resizing the window (camera magnification) for the next video frame. The error signal 43 derived by the FIG. 5 circuitry is utilized in the FIG. 6 circuitry. The centerline error voltage 43 is summed with analog signal 66 in summation amplifier 48; amplifier output 67 represents the leadng edge of the recomputed next window. Centerline error voltage 43 is subtracted from analog signal 66 in amplifier 50. Amplifier output 69 represents the trailing edge of the recomputed next window.

Amplifier outputs 67 and 69 provide the basis for an output pulse 71 whose width and location represent recomputed window size in the X—X plane. Pulse 71 development requires comparison of amplifier voltages 67 and 69 with a negative slope ramp generator voltage 73 developed by ramp generator electronics 72 during the inactive "blanking" period between the end of one video frame and the next frame. In the chart beneath FIG. 6 the square wave 74 occurs during this blanking period. Electronics 72 transforms an input square wave 74 into an output ramp type signal 73 that is applied to comparators 75 and 77. Intersection of voltage 67 with the ramp voltage produces the leading edge of output pulse 71. Intersection of voltage 69 produces the trailing edge of the output pulse. FIG. 6 depicts electronics for computing width of the next video frame in the X—X plane; similar electronics might be used for computing frame size in the Y—Y plane.

The invention provides circuitry for detecting elevation and azimuth errors in target lock-on points from one video frame to the next. The invention also provides circuitry for repetitively recomputing window size necessary to maintain the target size relatively constant in spite of rapid range changes due to movement of the target toward or away from the camera.

FIG. 7—CONTRAST ENHANCEMENT CIRCUIT

Operation of the system requires that the digitized video signals generated by the background video spots be discernably different than the video signals generated by the target. FIG. 7 depicts a circuit for adaptively thresholding the contrast between background and target signals. Noncomposite video containing positive and negative values is inputed to amplifier 80 through line 82.

A second input voltage $V_{INT}$ is applied to amplifier 80 through line 83. $V_{INT}$ is initially developed in addition-division device 93 that senses the difference in the positive and negative peak voltages outputed from peak detectors 88 and 90, that are referenced to background voltage $V_{BCK}$ 86 taken by sample and hold circuit 89. Device 93 provides a voltage signal $V_{INT}$ that lies midway between the positive and negative peaks.

Intermediate voltage $V_{INT}$ is applied through line 83 to amplifier 80 so that amplifier 80 output 84 provides a "corrected" modulated signal. The correction shifts the signal up or down to center the peaks relative to $V_{INT}$. Outputs from peak detectors 88 and 90 are applied to addition-division devices 85 and 87 to provide reference voltages at 94 and 96. The $V+_{REF}$ voltage 94 and the $V-_{REF}$ voltage 96 are compared to the modulating signal voltage 84 developed by amplifier 80.

The background levels in the immediate area of the target 12c (FIGS. 3 and 4) is sampled and held by circuit system 89 to develop the $V_{BCK}$ reference voltage 86 utilized as the reference for peak detectors 85 and 87 respectively. It will be noted that reference voltage 94 lies midway between $V_{BCK}$ and the positive peak. Reference voltage 96 lies midway between $V_{BCK}$ and the negative peak. Digitized outputs from comparators 98 and 99 represent peak values higher or lower than reference voltages 94 and 96; momentary peak signals within the intermediate band between voltages 94 and 96 are excluded or screened out of the computation. This intermediate band or zone represents grey clutter areas in the video picture that approach the target in luminance or radiance. The illustrated circuitry excludes these areas from the final digital outputs 100. The digital output is thus corrected to enhance the contrast between target 12 and background 13. The contrast enhancement band between $V+_{REF}$ and $V-_{REF}$ can shift slightly up or down with changes in the general luminosity level of the scene in the camera field of view.

I wish it to be understood that I do not desire to be limited to the exact details of construction shown and described for obvious modifications will occur to a person skilled in the art.

I claim:

1. In a video tracker for viewing a distant target (12) and background scene (13) to produce a tracking window (10) having a leading edge and a trailing edge: the combination comprising means for enhancing contrast between target video and background video, comprising a first amplifier (80) having an input for receiving digitized video signals produced by the tracker, a positive peak detector (88) and negative peak detector (90) receiving digital signals from the amplifier, addition-division device (93) receiving digital signals from the detectors and supplying an intermediate input digital voltage $V_{INT}$ back to the input of the amplifier so that peak detector signals are centered on the $V_{INT}$ signal, and comparator means (98 and 99) for comparing signals derived from the peak detectors with the digital signal produced by the amplifier to provide digitized output signals (100) representing enhanced contrast between the target and background scene;

means for producing an analog signal (43) representing a video lock-on target center point, said signal-producing means including a first logic means (32) translating the aforementioned digitized output signals into digital signals representing the distance between a video window leading edge and the target leading edge, a second logic means (34) translating the aforementioned digitized output signals into digital signals representing the distance between the target leading edge and a point midway between the target edges, and means (38, 40 and 42) converting the last mentioned digital signals into a first analog signal (43) representing the target center point;

and means for deriving a signal representing changes in size of the target, comprising a target height counter circuit (52) that produces a second analog signal (66) related to target size, a second amplifier (48) summing the first and second analog signals into an output representing one edge of a video window, a third amplifier (50) differencing the first and second analog signals into an output representing another edge of a video window and ramp generator means (72) providing a sloping signal (73) that intersects the outputs from the second and third amplifiers.

2. The combination of claim 1 wherein the means for producing an analog signal representing a video lock-on target center point comprises trigger means (29) operating at clock frequency to control said first logic means, and second trigger means (31) operating at clock/2 frequency to control said second logic means.

3. The combination of claim 2 wherein said first logic means is constructed to transmit only digitized output signals associated with the background scene, and said second logic means is constructed to transmit only digitized output signals associated with the target.

4. The combination of claim 2 wherein the means for producing an analog signal representing a video lock-on target center point comprises an OR gate (38) receiving and transmitting the signals produced by said first logic means and said second logic means, a counter-register (40) for counting the digital signals transmitted by the OR gate, and a digital-analog converter (42) for translating the last-mentioned counted signals into an analog signal representative of the lock-on target center point.

5. The combination of claim 1 wherein said target height counter circuit (52) includes an AND gate (56) receiving digital signals associated with scan lines passing through the target and other digital signals associated with scan lines passing only through the background scene, means (62) for counting the digital signals produced by said AND gate, and a digital-analog converter (64) for translating the counted signals into an analog signal representative of target height.

* * * * *